United States Patent
Kim et al.

(10) Patent No.: US 6,571,099 B1
(45) Date of Patent: May 27, 2003

(54) CELL SEARCHING METHOD IN ASYNCHRONOUS WIDEBAND CODE DIVISION MULTIPLE ACCESS SYSTEM

(75) Inventors: Il Kyu Kim, Seoul (KR); Sang Wook Ha, Seoul (KR); Byoung Woo Lim, Kyunggi-Do (KR); Sang Gil Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 0 days.

(21) Appl. No.: 09/426,852

(22) Filed: Oct. 26, 1999

(30) Foreign Application Priority Data

Oct. 26, 1998 (KR) .............................. 98-45625
Sep. 15, 1999 (KR) .............................. 99-39503

(51) Int. Cl.$^7$ ................................................ H04L 9/00
(52) U.S. Cl. ...................... 455/442; 455/515; 370/342; 370/331
(58) Field of Search ................................ 455/434, 442, 455/515, 455, 437; 370/329, 331, 335, 277, 310.1, 342, 350

(56) References Cited

U.S. PATENT DOCUMENTS 5,765,111 A    6/1998  Kim ........................... 455/462
5,930,366 A  * 7/1999  Jamal et al. ................. 370/509
6,185,244 B1 * 2/2001  Nystrom et al. ............. 375/145
6,205,132 B1 * 3/2001  Hong et al. .................. 370/342

* cited by examiner

Primary Examiner—Daniel Hunter
Assistant Examiner—Nick Corsaro
(74) Attorney, Agent, or Firm—Lahive & Cockfield, LLP

(57) ABSTRACT

A method for quickly searching a cell at a mobile station by using a synchronization channel structure of a forward link in a code division multiple access system which operates by an asynchronous mode between base stations is provided. In the method, a predetermined starting point among a plurality of locations of sync channel codes in a frame with respect to a base station having a minimal channel loss is obtained. Long code group and frame sync information at the mobile station are obtained based on outputs of a matched filter every mini slot clock location for one frame time after a starting point of a current mini slot. A long code based on the obtained long code group and frame sync information obtained is detected wherein the long code is used for band-spreading of a forward link by a current base station.

7 Claims, 10 Drawing Sheets

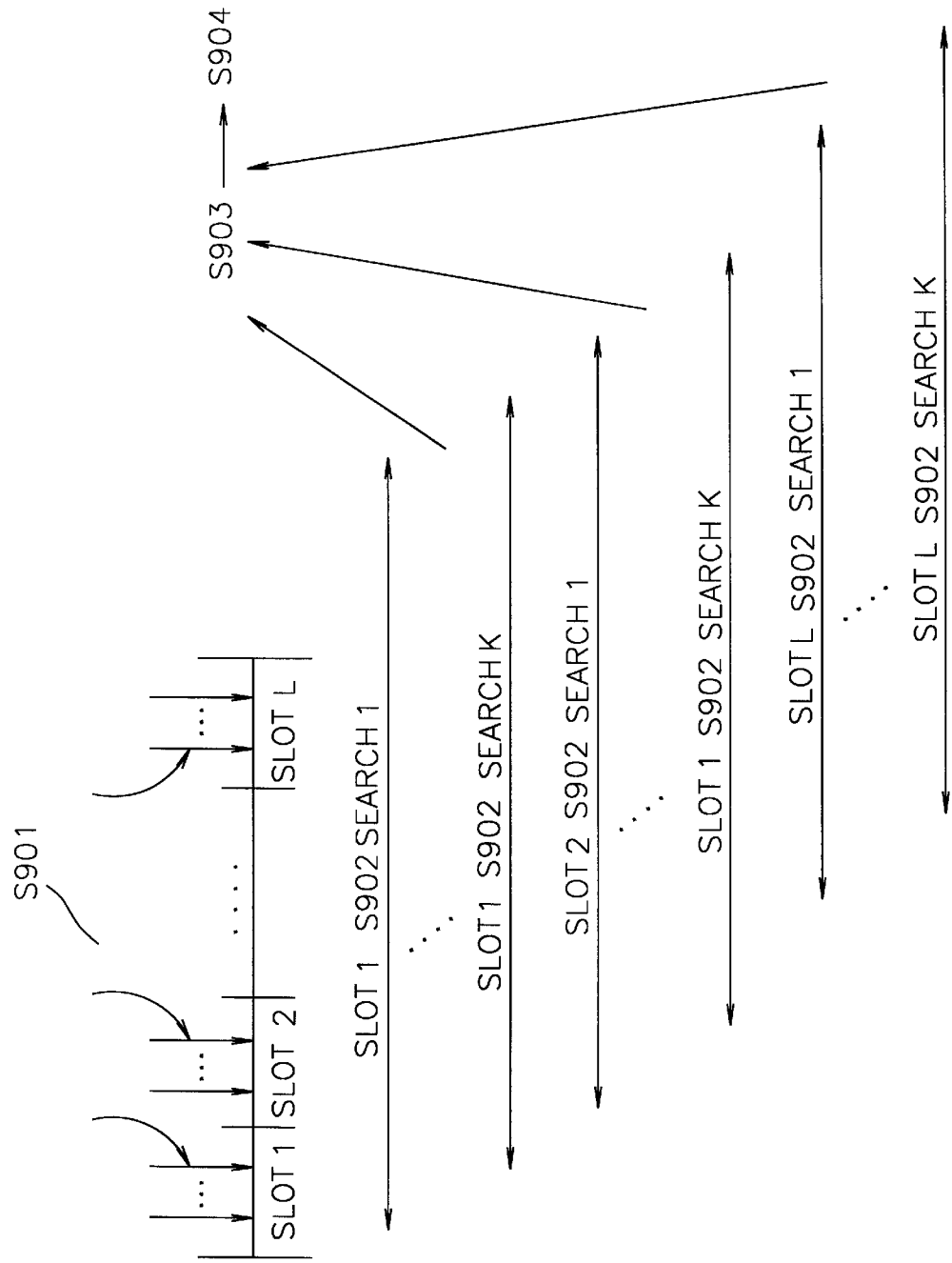

CELL SEARCHING METHOD IN ASYNCHRONOUS WIDEBAND CODE DIVISION MULTIPLE ACCESS SYSTEM

BACKGROUND OF THE INVENTION

1. Field of the Invention

The present invention relates to a cell searching method, more particularly, to a method for quickly searching a cell at a mobile station by using a synchronization channel structure of a forward link in a code division multiple access (CDMA) system which operates by an asynchronous mode between base stations.

2. Prior Art

In an interim standard (IS)-95 CDMA system, all base stations operate by using a frame synchronization between base stations based on an external time such as a global positioning system (GPS) receiver. In a wideband CDMA system which has been proposed in Europe or Japan as an international mobile telecommunication system-2000 wireless transmission technique, all the mobile stations can operate without a frame synchronization between base stations differently from that of the IS-95 CDMA system. In the synchronous IS-95 CDMA system, a mobile station discriminates each base station based on a phase difference with respect to an absolute time of one code sequence. On the other hand, in an asynchronous wideband CDMA system which has been proposed in Europe or Japan, the mobile station discriminates each base station based on different code sequences. Since the asynchronous wideband CDMA system does not need the GPS receiver, a cell searching time of a mobile station is lengthened at an initial calling set or a hand off. In order to decrease a cell searching time in the asynchronous wideband CDMA system, it uses two synchronization channels in a forward link.

U.S. Pat. No. 5,765,111(issued to Kyou-Woong Kim on Jun. 9, 1998) discloses a method and apparatus for selectively calling a mobile station by generating a ring signal at only a selected mobile station among a plurality of mobile stations registered to a private base station.

FIG. 1 shows a synchronization channel structure of a forward link which is used for a conventionally synchronous wideband CDMA system. The synchronization channel (SCH) of a forward link includes a primary SCH(C) and a secondary SCH($C_i^1$, $C_i^2$, ..., $C_i^{15}$, $C_i^{16}$). The primary SCH(C) is composed of a binary code having 256 chips which are not modulated. Each code of the primary SCH(C) is transmitted every slot at a slot boundary. The slot has a length of 0.625 msec. One frame of the primary SCH(C) has a time interval of 10 msec. As mentioned above, each code of the primary SCH(C) is transmitted every slot, that is, sixteen codes of the primary SCH(C) are repeatedly transmitted in every frame. In the synchronous wideband CDMA system, all base stations use an identical code as the primary SCH(C). The primary SCH(C) is used for searching a starting location of 16 slots per one frame.

The secondary SCH($C_i^1$, $C_i^2$, ..., $C_i^{15}$, $C_i^{16}$) is composed of sixteen code sequences of an orthogonally binary gold code which have not been modulated. Each of the sixteen code sequences corresponds to each of the primary SCH(C). Each element of the secondary SCH($C_i^1$, $C_i^2$, ..., $C_i^{15}$, $C_i^{16}$) is selected from an orthogonally binary code group ($C_1$, $C_2$, ..., $C_{16}$, $C_{17}$) each having seventeen elements. That is, $C_i^t \in \{C_1, C_2, ..., C_{16}, C_{17}\}$. The secondary SCH($C_i^1$, $C_i^2$, ..., $C_i^{15}$, $C_i^{16}$) indicates a code group (group i) to which a long code belongs. A current base station uses the long code. 512 different long codes are used in the system and divided into 32 long code groups. Each of the 32 long code groups is discriminated based on the secondary SCH($C_i^1$, $C_i^2$, ..., $C_i^{15}$, $C_i^{16}$). That is, 32 different secondary SCHs are present at the system. The secondary SCH uses a hopping code such as a Reed-Solomon code. An alphabet size and a length of the secondary SCH are 17 and 16, respectively. 32 possible sequences of the secondary SCH ($C_i^1$, $C_i^2$, ..., $C_i^{15}$, $C_i^{16}$) are unique with respect to a cyclic shift. For example, an optionally cyclic shift, a code sequence length of which is smaller than 16 and is not zero, is always different from a cyclic shift except the optional cyclic shift, a code sequence length of which is smaller than 16. Such a feature of the secondary SCH is used for uniquely determining a long code group and a starting point of 10 msec frame by means of a mobile station.

An initial synchronization obtaining method by a mobile station will be described referring to FIGS. 1 and 2. FIG. 2 illustrates an initial synchronization obtaining method by a mobile station.

In step S201, a mobile station (not shown) searches a predetermined starting point of a slot with respect to a base station (not shown) having a minimal channel loss by using a primary SCH(C) as shown in FIG. 1, by means of a matched filter (not shown).

In step S202, the mobile station obtains long code group information and frame sync information of 10 msec. The long code group information and frame sync information of 10 msec are obtained by correlating 17 possible secondary SCH($C_i^1$, $C_i^2$, ..., $C_i^{15}$, $C_i^{16}$) with respect to a mobile station receiving signal at a slot location. The step S202 will be described in detail below. The mobile station calculates decision variables with respect to 512 sequences which includes 32 possible sequences and 16 cyclic shifts each that the 32 possible sequences may have. The decision variables are obtained by non-coherently adding 17 correlator outputs with respect to a sequence corresponding to a corresponding decision variable at each of 16 secondary synchronization channel locations. The mobile station obtains the long code group information and frame sync information by selecting a maximum value among 512 decision variables.

In step S203, the mobile station judges what kind of code is the long code based on the long code group information and frame sync information, that is, a frame location information (frame boundary) obtained in step S202. That is, correlating operations with respect to 16 long codes included in the long code group obtained in step S202 are performed to obtain correlating results. When a maximum value of the correlating results is larger than a set threshold value, the mobile station judges that the long code having the maximum value is a code for a band spreading of a forward link which a current base station uses.

However, the conventional cell searching method is satisfied with orthogonal feature between a forward synchronization channel and a traffic channel. An interference between a synchronization channel and a traffic channel with respect to a signal received through an identical path of an identical cell occurs. The interference causes reduction in a capacity of a forward link and increases a searching time of a mobile station. The conventional cell searching method needs two sync channels and a mobile station needs 17 parallel correlators so that it has a complex configuration. Since the 17 parallel correlators should be used to continue searching a neighboring cell for a handoff after a call set, power consumption is increased.

SUMMARY OF THE INVENTION

Therefore, it is an object of the present invention, for the purpose of solving the above mentioned problems, to provide a cell searching method which provides long code group information and frame sync information by using a location of a sync channel code with respect to a starting point of a slot by one sync channel.

In order to attain the object, according to the present invention, there is provided a cell searching method in an asynchronous wideband code division multiple access system, said method comprising the steps of:

(a) obtaining a predetermined starting point among a plurality of locations of sync channel codes in a frame with respect to a base station having a minimal channel loss;

(b) obtaining long code group and frame sync information at the mobile station based on outputs of a matched filter every mini slot clock location for one frame time after a starting point of a current mini slot; and (c) detecting a long code based on the long code group and frame sync information obtained in step (b) wherein the long code is used for band-spreading of a forward link by a current base station.

Preferably, step (b) includes (b-1) calculating a plurality of decision variables corresponding to each of a plurality of pseudo time hopping code sequences based on the outputs of a matched filter; (b-2) selecting a pseudo time hopping code sequence corresponding to a decision variable having a maximum value among the plurality of decision variables; and (b-3) obtaining the long code group and frame sync information based on the pseudo time hopping code sequence selected in step (b-2).

There is also provided a cell searching method in an asynchronous wideband code division multiple access system, said method comprising the steps of:

(i) selecting one maximum value per slot, that is, L (where, L is an integer greater than one as the number of slots per frame) pieces of maximum value per frame based on outputs of a matched filter with respect to a sync channel code and selecting S(where, $2 \leq S \leq L$) pieces of values from the L pieces of maximum values;

(ii) calculating ($N_{GROUP} \times L \times S$) decision variables corresponding to each of a plurality of pseudo time hopping code sequences with respect to each location which corresponds to the S pieces of selected maximum values, the $N_{GROUP}$ represents the number of long code groups which are used in the system;

(iii) obtaining long code group and frame sync information based on the calculated ($N_{GROUP} \times L \times S$) decision variables; and (iv) detecting a long code based on the long code group and frame sync information obtained in step (iii) wherein the long code is used for band-spreading of a forward link by a current base station.

Furthermore, there is provided a cell searching method in an asynchronous wideband code division multiple access system, said method comprising the steps of:

selecting K values (where, L and K are an integer greater than 1) per frame among a plurality of sampling values every one slot at L pieces of slots, that is (L×K) maximum values per frame;

calculating ($N_{NEIGHBORD} \times L \times K \times L$) decision variables corresponding to each of a plurality of pseudo time hopping code sequences with respect to each location which corresponds to the (K×L) selected maximum values wherein the $N_{NEIGHBORD}$ represents the number of groups of a neighboring cell a mobile station should search in a mobile station idle or active state;

obtaining long code group and frame sync information of a neighboring cell based on the calculated ($N_{NEIGHBORD} \times L \times K \times L$) decision variables; and detecting a long code that is used for band spreading of a forward link by a current base station based on the detected long code group and frame sync information.

Other objects and further features of the present invention will become apparent from the detailed description when read in conjunction with the attached drawings.

BRIEF DESCRIPTION OF THE DRAWINGS

Other features and advantages of the present invention will become more apparent from the following description taken in connection with the accompanying drawings, wherein:

FIG. 6 is a view for showing one example of a time hopping code which may be used for the fast cell searching method illustrated in FIG. 4;

FIG. 10 is a view for illustrating a principle of a cell searching method illustrated in FIG. 7.

DETAILED DESCRIPTION OF THE PREFERRED EMBODIMENT

The preferred embodiment of the present invention will hereinafter be described in detail with reference to the accompanying drawings.

Figure 1:
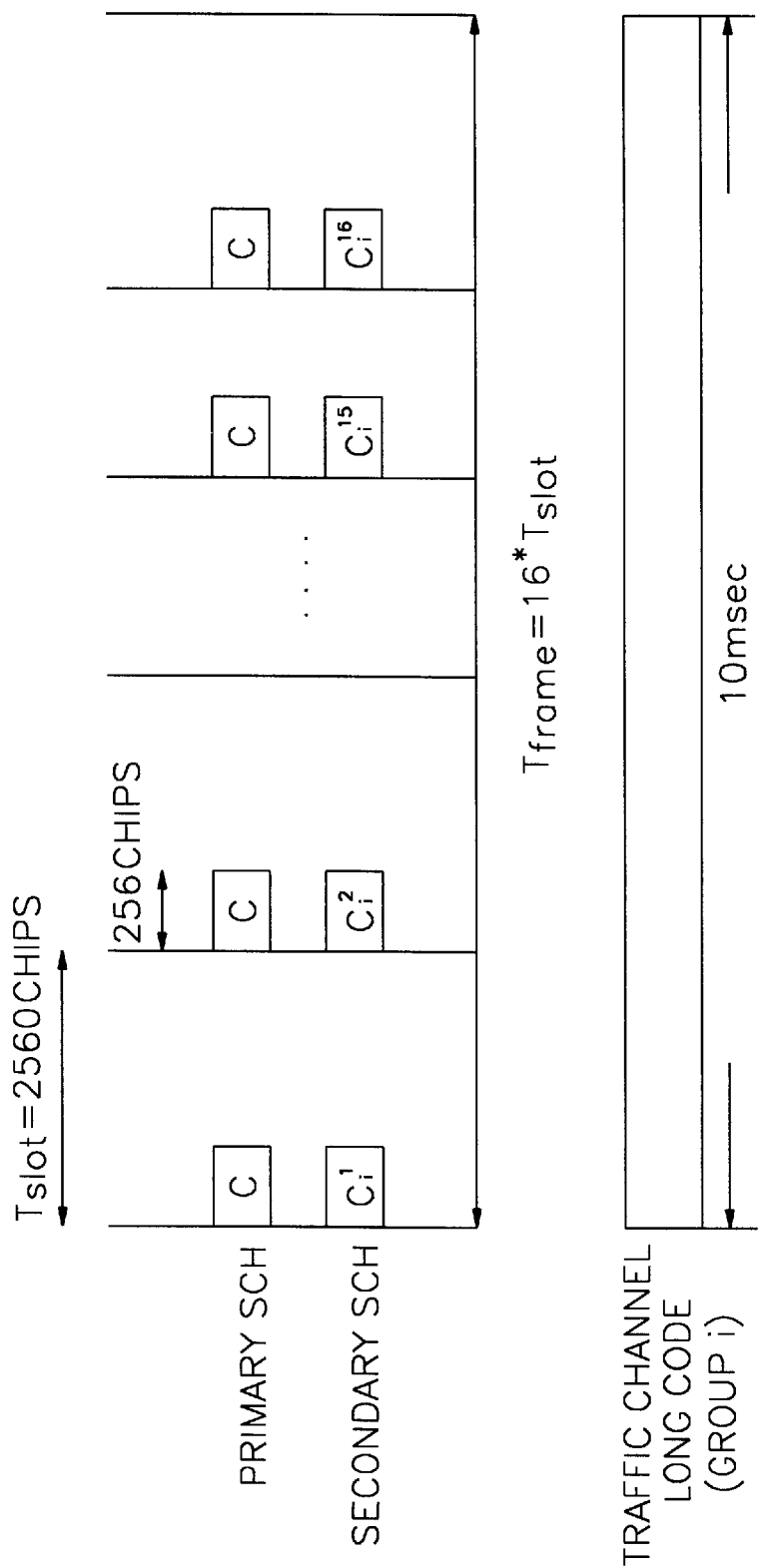
FIG. 1 is a view for showing a sync channel structure of a forward link which is used for a conventional asynchronous wideband code division multiple access system.
Figure 2:
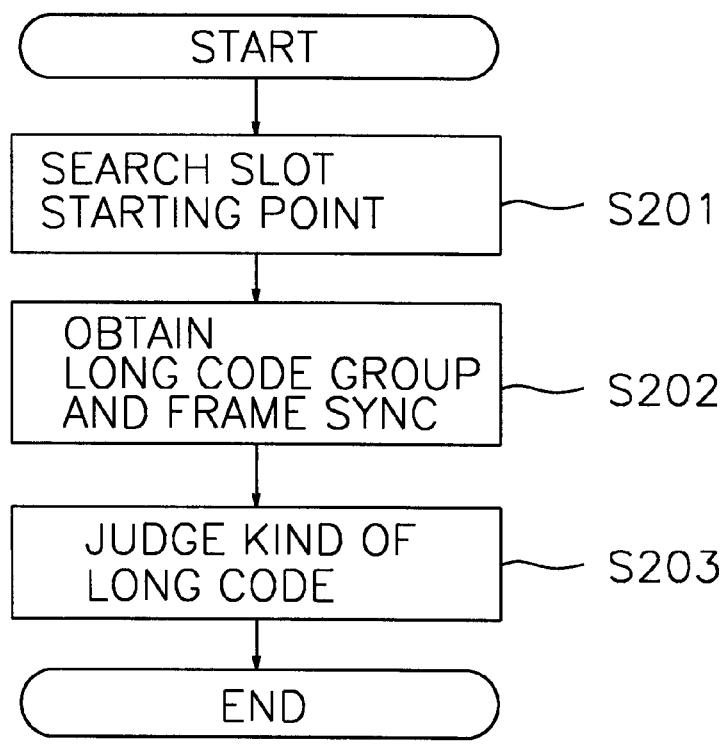
FIG. 2 is a flow chart for illustrating a conventional initial sync obtaining method of a mobile station.
Figure 3:
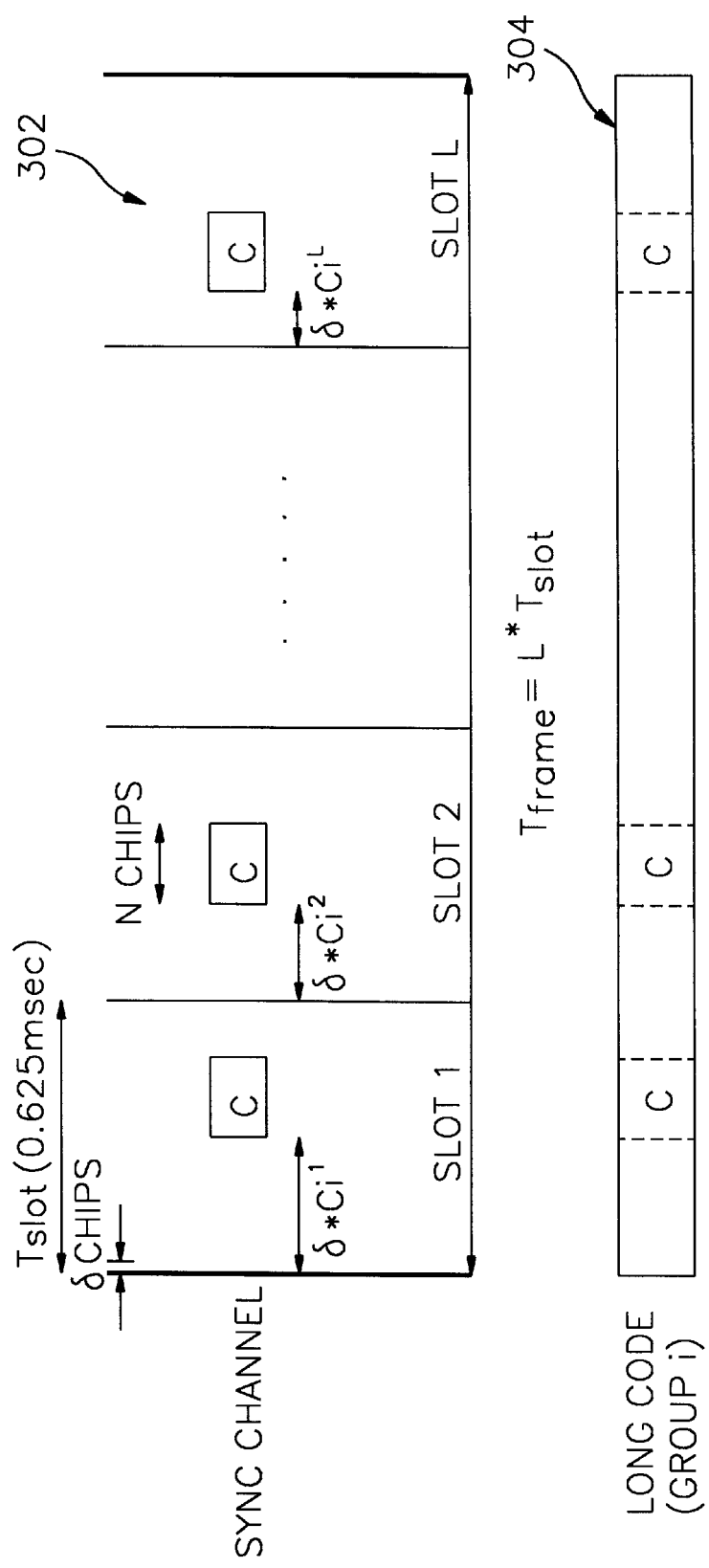
FIG. 3 is a view for showing a sync channel structure of a forward link which is used for an asynchronous wideband code division multiple access system according to a first embodiment of the present invention.

FIG. 3 is a view for showing a sync channel structure of a forward link which is used for an asynchronous wideband code division multiple access system according to a first embodiment of the present invention.

A sync channel code 302 is composed of a binary code having N (where, N is a positive integer) chips which are not modulated. Each code of the sync channel codes is transmitted every slot at a slot boundary. $T_{frame}$ represents a frame length. One frame is divided into L (where, L is a positive integer) slots. The slot is divided into a plurality of mini slots. A length of the mini slot is $\delta \times T_C$, where $\delta$ is a positive integer and $T_C$ represents a chip width which is used for the system.

In a first embodiment of the present invention, a sync channel code location of each slot has a value which coincides with each code element of a time hopping code corresponding to a long code group to which a current base station belongs. A length of a time hopping code used for the present invention is identical with the number L of slots per frame. An alphabet size M of each time hopping code has a value which is equal to or fewer than the number of slots. The number of time hopping codes which is used for the present invention is identical with the number of long code groups and is represented as $N_{GROUP}$.

Time hopping code sequences according to the present invention should be uniquely designed with respect to a cyclic shift of a code. That is, an optional code sequence which has performed one cyclic shift or cyclic shifts except L cyclic shifts is different from another code sequence which has performed cyclic shifts smaller than the L cyclic shifts. This feature causes the mobile station to uniquely determine long code group information and frame sync information while searching a cell.

Figure 4:
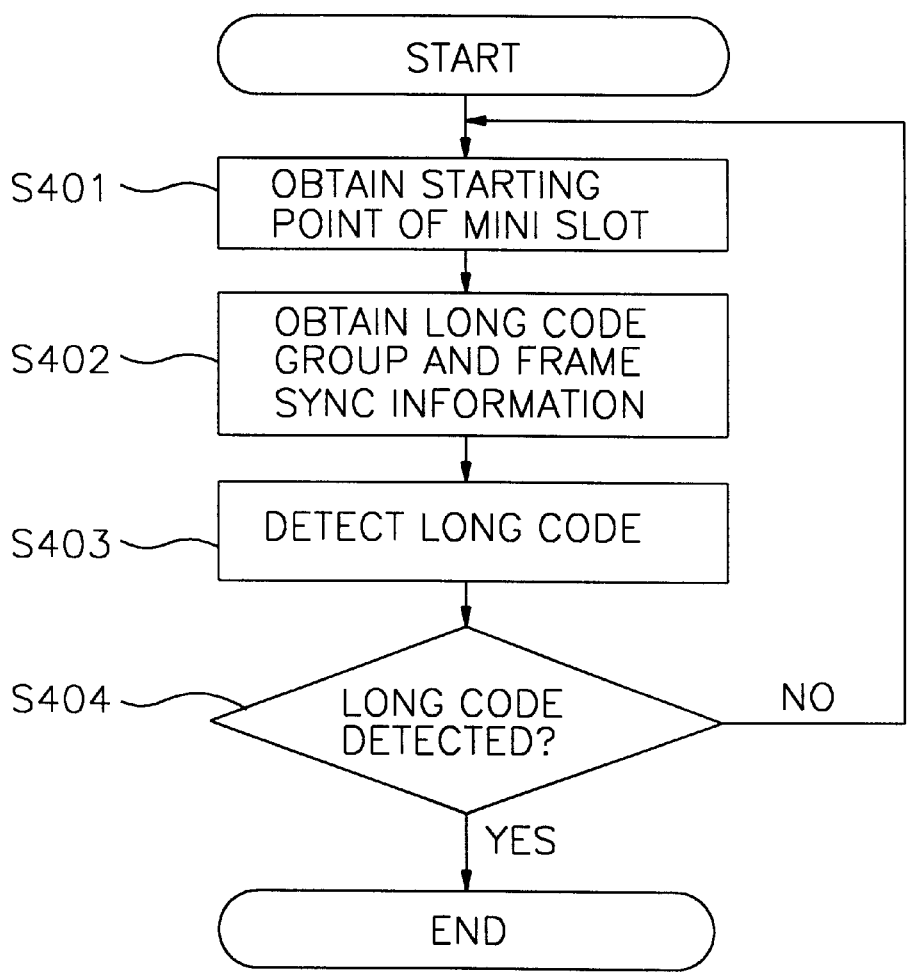
FIG. 4 is a flow chart for illustrating a fast cell searching method in an asynchronous wideband code division multiple access system according to a first embodiment of the present invention.

Hereinafter, a fast cell searching method in an asynchronous wideband code division multiple access system according to a first embodiment of the present invention will be explained with reference to FIG. 4. FIG. 4 is a flow chart for illustrating a fast cell searching method in an asynchronous wideband code division multiple access system according to a first embodiment of the present invention.

In step S401, a mobile station (not shown) obtains a predetermined starting point of a mini slot among a plurality of sync channel code locations in a frame with respect to a base station (not shown) having a minimal channel loss.

In step S402, the mobile station obtains long code group information and starting point information of 10 msec frame, that is, frame sync information by using outputs of a matched filter (not shown) every mini slot clock location, that is, in every δ chips for one frame after a starting point of a current mini slot. The step S402 will be described in detail below. The mobile station has all possible cyclic shift information of a time hopping code sequence, that is, shift information of $N_{GROUP} \times L$. The mobile station obtains the long code group and frame sync information by using shift information of $N_{GROUP} \times L$ and outputs of a matched filter every mini slot clock location. That is, the mobile station calculates decision variables for one frame corresponding to each of $N_{GROUP} \times L$ sequences. Each decision variable is obtained by non-coherently adding outputs of the matched filter in relative locations which correspond to each element of a corresponding code sequence. The relative location is determined by a first element value of each time hopping code sequence. That is, each decision variable is a sum of 16 outputs of the matched filter which is selected every slot. The mobile station obtains the long code group and frame sync information by selecting a maximum value among $N_{GROUP} \times L$ (512) decision variables.

Figure 5:
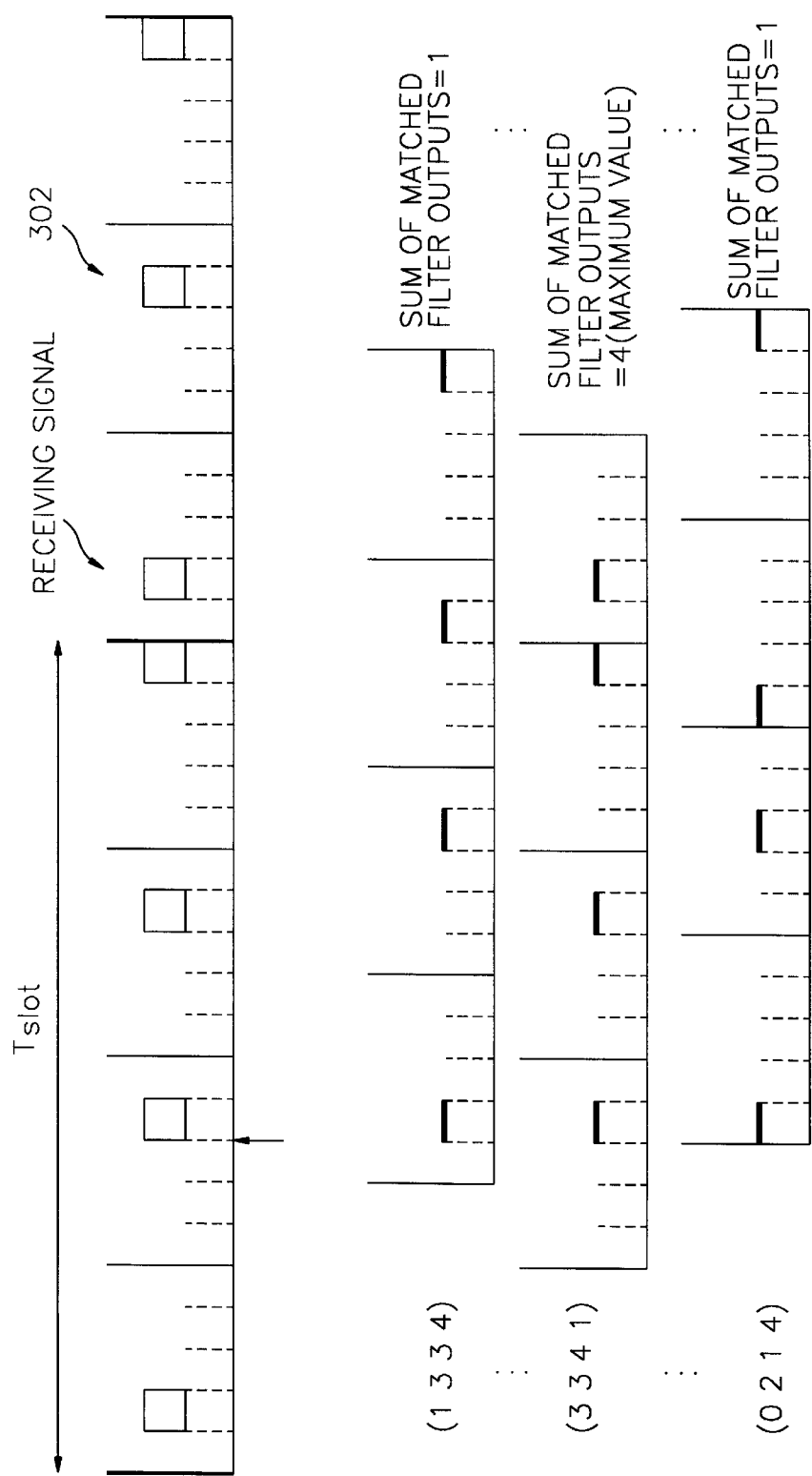
FIG. 5 is a view for illustrating steps of obtaining long code group information and frame sync information shown in FIG. 4.

FIG. 5 is a view for illustrating the step S402 shown in FIG. 4. In FIG. 5, the number of long code groups is two.

$T_{frame}$ represents a frame length. One frame is divided into four slots. The slot is divided into five mini slots. The number of mini slots per slot is 5 and an alphabet size of a time hopping code is identical with the number of mini slots per slot. A time hopping code of a first group is (1 3 3 4) and a time hopping code of a second group is (4 0 2 1).

Total cyclic shift ⇒ (1 3 3 4) (4 1 3 3) (3 4 1 3) (3 3 4 1)

(4 0 2 1) (1 4 0 2) (2 1 4 0) (0 2 1 4)

Time shift (slots)   0     1     2     3

Figure 6:
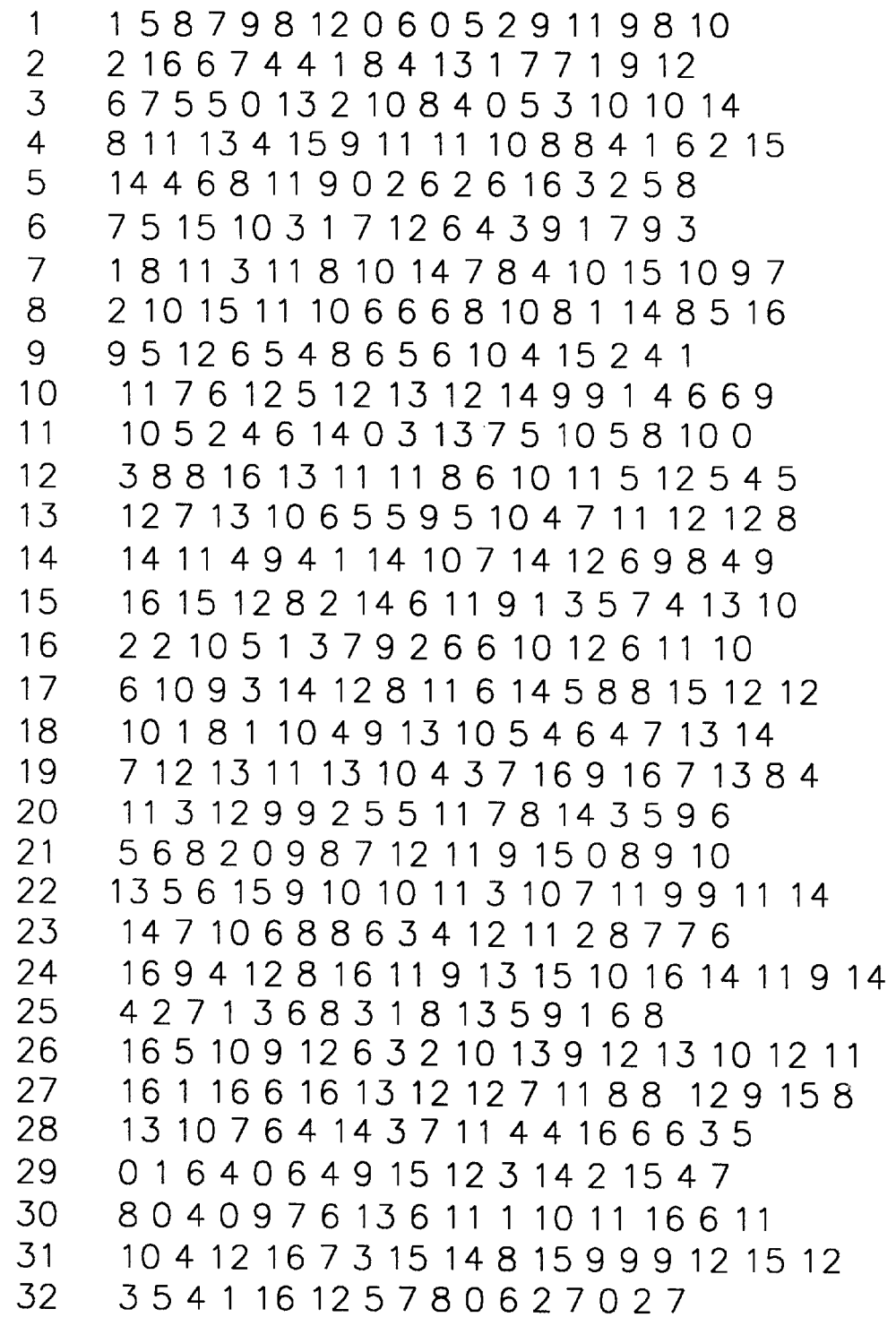

FIG. 6 shows one example of a time hopping code which may be used for the fast cell searching method illustrated in FIG. 4. The time hopping code is a subset of Reed-Solomon codewords whose alphabet size is 17 and the length is 16. All 16 cyclic shifts of each code word are unique, and the minimum Hamming distance between code words is 14. The time hopping code can be used to encode 32 long code groups, and to provide complete frame timing information. The maximum number of hitting between any two sequences for any mini slot wise (128 chips) time shift is 4, even though the number of mini slots per slot (0.625 msec) is 20 (because the alphabet size of hopping code is 17, the last 13 mini slots are not used).

In step S403, the mobile station detects a long code by using the long code group and frame sync information obtained in step S402. A correlating operation with respect to long codes corresponding to a long code group obtained in step S402 is performed from a starting point of a frame obtained in step S402 to obtain the correlating results. When a maximum value among the correlating results is greater than a set threshold value, the mobile station judges that the long code having the maximum value is a code which is used for band-spreading of a forward link by a current base station.

In step S404, the mobile station judges whether the long code is detected. As a result of the judgement in step S404, when the long code is not detected, the routine returns to step S401. On the contrary, when it is judged in step S404 that the long code is detected, a total operation finishes.

According to the first embodiment of the present invention, in order to obtain orthogonal feature between a sync channel and a traffic channel, a sync channel code is inserted at a sync channel code location with respect to a long code. The long code is used for a direct sequence band spreading of a traffic channel. At this time, since interference from a traffic channel received through a sync channel code at a sync channel code location is not generated, a detecting probability of a sync channel code matched filter is increased to reduce an initial sync obtaining time of a mobile station. In the conventional method, one of two sync channel codes is inserted into a long code and the other sync channel code remains so that it does not satisfy orothogonal feature. Since an inserting location of the sync channel code is identical for every slot, a capacity of a traffic channel can be reduced when a slot starting point is in accord with a neighboring base station. On the contrary, in the first embodiment of the present invention, a binary hopping code having a good correlating and self-relating feature is used for modulating a location of a sync channel code, it can solve the disadvantages of the conventional method.

Figure 7:
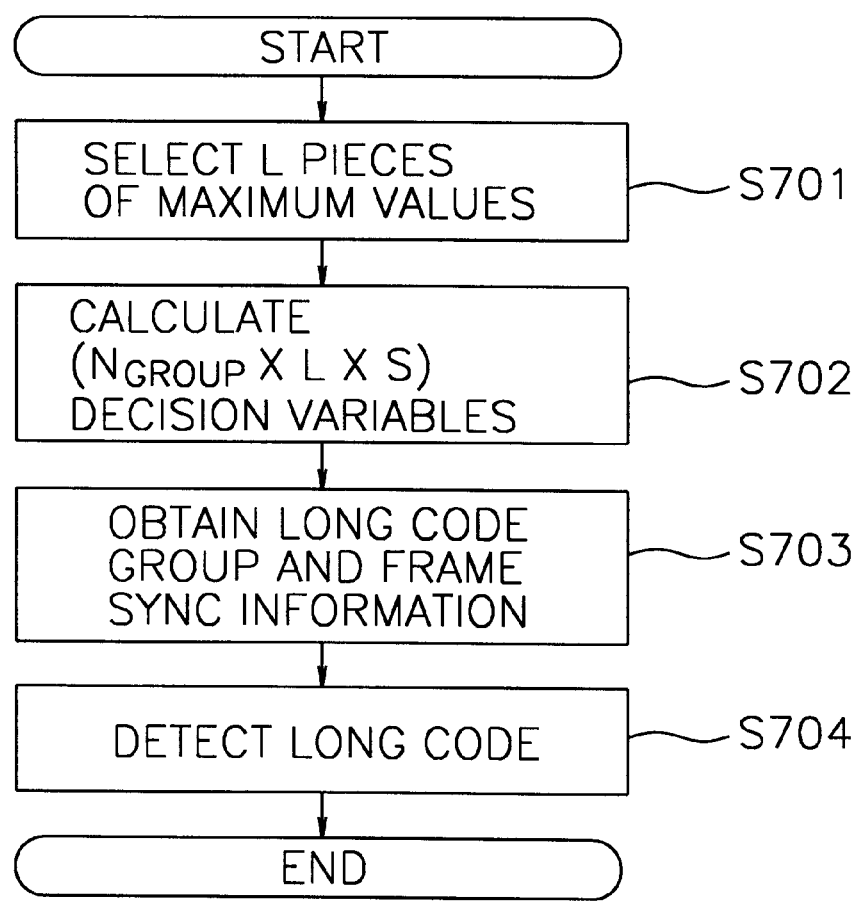
FIG. 7 is a flow chart for illustrating a fast cell searching method in an asynchronous wideband code division multiple access system according to a second embodiment of the present invention.
Figure 8:
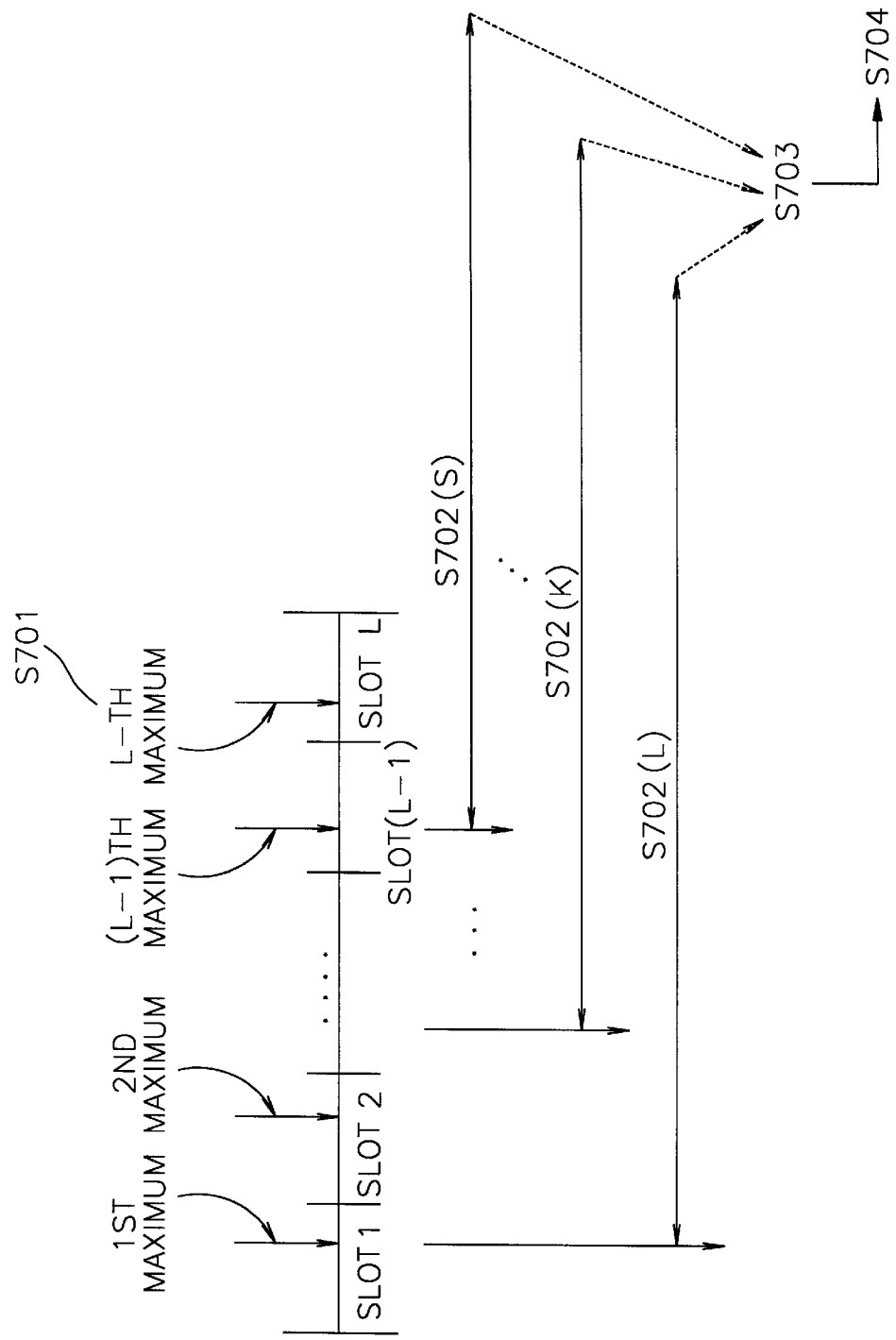
FIG. 8 is a view for illustrating a principle of a cell searching method illustrated in FIG. 7.

Hereinafter, a fast cell searching method in an asynchronous wideband code division multiple access system according to a second embodiment of the present invention will be explained with reference to FIGS. 7 and 8. FIG. 7 is a flow chart for illustrating a fast cell searching method in an asynchronous wideband code division multiple access system according to a second embodiment of the present invention. FIG. 8 is a view for illustrating a principle of a fast cell searching method illustrated in FIG. 7.

In step S701, a receiver (not shown) according to the present invention selects one maximum value among 2560 sampling values every one slot at L pieces of slots, that is, L pieces of maximum values per frame, that is, L maximum values per frame. Preferably, an embodiment of the present invention, the L is 16.

In step S702, the receiver selects S (where, $2 \leq S \leq L$) pieces of maximum values among the L pieces of maximum values per frame from the greatest value in order and calculates ($N_{GROUP} \times L \times S$) decision variables corresponding to each of a plurality of pseudo time hopping code sequences with respect to each location which corresponds to the S pieces of selected maximum values. The $N_{GROUP}$ represents the number of long code groups which are used in the system. Preferably, in an embodiment of the present invention, the $N_{GROUP}$ is 32. Each of the decision variables is obtained by non-coherently adding outputs of the matched filter at a relative location which corresponds to each element of a corresponding code sequence. The relative location is determined by a first element of each of the time hopping code sequences. That is, each decision variable is a sum of 16 outputs of the matched filter in which one variable is selected every slot.

In step S703, a mobile station (not shown) obtains long code group and frame sync information by selecting a maximum value among the ($N_{GROUP} \times L \times S$) decision variables calculated in step S702. The frame sync information represents information with respect to a starting point of a frame.

In step S704, the mobile station detects a long code that is used for band spreading of a forward link by a current base station by using the long code group and frame sync information detected in step S703. A correlating operation with respect to long codes corresponding to a long code group obtained in step S703 is performed from a starting point of a frame obtained in step S703 to obtain the correlating results. When a maximum value among the correlating results is greater than a set threshold value, the mobile station judges that the long code having the maximum value is a code which is used for band-spreading of a forward link by a current base station.

Figure 9:
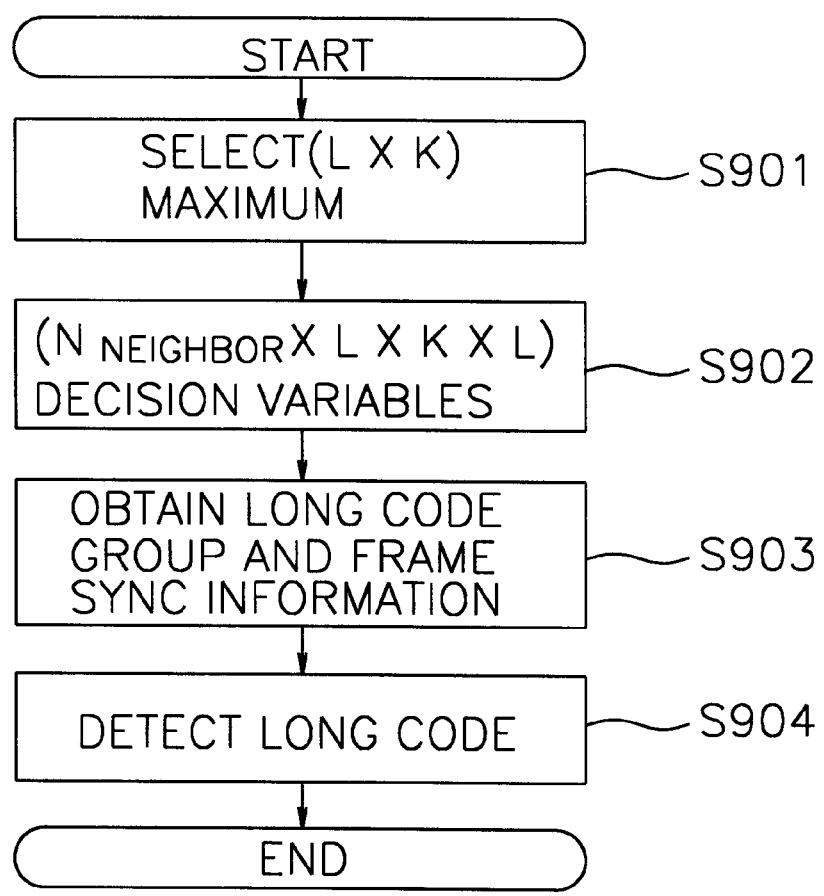
FIG. 9 is a flow chart for illustrating a fast cell searching method in an asynchronous wideband code division multiple access system according to a second embodiment of the present invention.

Hereinafter, a fast cell searching method in an asynchronous wideband code division multiple access system according to a second embodiment of the present invention will be explained with reference to FIGS. 9 and 10. FIG. 9 is a flow chart for illustrating a fast cell searching method in an asynchronous wideband code division multiple access system according to a third embodiment of the present invention. FIG. 10 is a view for illustrating a principle of a fast cell searching method illustrated in FIG. 9.

In step S901, a receiver (not shown) according to the present invention selects K (where, K is an integer greater than 1) maximum values per frame among 2560 sampling values every one slot at L pieces of slots, that is, (L×K) values per frame. Preferably, in an embodiment of the present invention, the L is 16.

In step S902, the receiver calculates ($N_{NEIGHBORD} \times L \times K \times L$) decision variables corresponding to each of a plurality of pseudo time hopping code sequences with respect to each location which corresponds to the (K×L) selected maximum values. The $N_{NEIGHBORD}$ represents the number of groups of a neighboring cell that a mobile station should search in a mobile station idle or active state. Preferably, an embodiment of the present invention, $1 \leq N_{NEIGHBORD} \leq N_{GROUP}$. Each of the decision variables is obtained by non-coherently adding outputs of the matched filter at a relative location which corresponds to each element of a corresponding code sequence. The relative location is determined by a first element of each of the time hopping code sequences.

In step S903, a mobile station (not shown) obtains long code group and frame sync information by selecting a maximum value among the ($N_{NEIGHBOR} \times L \times K \times L$) decision variables calculated in step S902.

In step S904, the mobile station detects a long code that is used for band spreading of a forward link by a current base station by using the long code group and frame sync information detected in step S903. A correlating operation with respect to long codes corresponding to a long code group obtained in step S903 is performed from a starting point of a frame obtained in step S903 to obtain the correlating results. When a maximum value among the correlating results is greater than a set threshold value, the mobile station judges that the long code having the maximum value is a code which is used for band-spreading of a forward link by a current base station.

As mentioned above, according to the present invention, in the asynchronous wideband CDMA system, a cell searching operation can be performed by one sync channel and a parallel correlator for obtaining long code group information and frame sync information of 10 msec is not necessary. Orthogonal feature between a sync channel and a traffic channel of a forward link can be maintained. Accordingly, the present invention reduces an initial sync obtaining time compared with the conventional cell searching method. No reduction of a capacity of a forward channel occurs and a complex of a mobile station can be reduced. Since an error which can be generated while obtaining long code group and frame sync information is reduced, a cell searching time is reduced so cell searching performance is increased. This increases an effect of performance in a low signal to noise ratio so that a required performance of cell searching can be obtained by a sync channel using small energy. The present invention in a second step uses outputs of a matched filter which are obtained in a first step so that additional hardware is not needed and a little calculation can improve a cell searching performance.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A cell searching method in an asynchronous wideband code division multiple access system, said method comprising the steps of:
   (a) obtaining a predetermined starting point among a plurality of locations of sync channel codes in a frame with respect to a base station having a minimal channel loss;
   (b) obtaining long code group and frame sync information at a mobile station based on outputs of a matched filter every mini slot clock location for one frame time after a starting point of a current mini slot;

(c) detecting a long code based on the long code group and frame sync information obtained in step (b) wherein the long code is used for band-spreading of a forward link by a current base station; and (d) forming each of the sync channel codes as a binary code having 156 chips which are not modulated, each of the sync channel codes being transmitted every slot at a slot boundary, and dividing one frame into 16 slots, each of the slots being divided into a plurality of mini slots.

2. The method as defined in claim 1, wherein step (b) includes the substeps of:

(b-1) calculating a plurality of decision variables corresponding to each of a plurality of time hopping code sequences based on the outputs of a matched filter;

(b-2) selecting a time hopping code sequence corresponding to a decision variable having a maximum value among the plurality of decision variables; and (b-3) obtaining the long code group and frame sync information based on the time hopping code sequence selected in step (b-2).

3. The method as defined in claim 1, wherein a correlating operation with respect to long codes corresponding to a long code group obtained in step (b) is performed from a starting point of a frame obtained in step (b) to obtain the correlating results, and the mobile station judges that the long code having the maximum value is a code which is used for band-spreading of a forward link by a current base station when a maximum value among the correlating results is greater than a set threshold value.

4. A cell searching method in an asynchronous wideband code division multiple access system, said method comprising the steps of:

(i) selecting one maximum value per slot by determining L pieces of maximum value per frame based on outputs of a matched filter with respect to a sync channel code and selecting S pieces of values from the L pieces of maximum values, such that S is in the range between $2 \leq S \leq L$ and L is an integer greater than 1;

(ii) calculating according to a formula decision variables corresponding to each of the plurality of pseudo time hopping code sequences with respect to each location which corresponds to the S pieces of selected maximum values, wherein $N_{GROUP}$ represents the number of long code groups which are used in the system;

(iii) obtaining long code group and frame sync information based on the calculated decision variables; and (iv) detecting a long code based on the long code group and frame sync information obtained in step (iii) wherein the long code is used for band-spreading of a forward link by a current base station.

5. The method as defined in claim 4, further comprising the step of obtaining each of the decision variables in step (ii) by non-coherently adding the outputs of the matched filter at a relative location which corresponds to each element of a corresponding code sequence.

6. The method as defined in claim 4, further comprising the step of obtaining the long code group and frame sync information by selecting a maximum value among the decision variables calculated in step (iii).

7. A cell searching method in an asynchronous wideband code division multiple access system, said method comprising the steps of:

selecting K values per frame among a plurality of sampling values every one slot at L pieces of slots, where L and K are integers greater than 1, and providing maximum values per frame;

calculating according to a formula decision variables corresponding to each of a plurality of pseudo time hopping code sequences with respect to each location which corresponds to the (K×L) selected maximum values wherein $N_{NEIGHBORD} \times L \times K \times L$ represents the number of groups of a neighboring cell a mobile station searches in a mobile station idle or active state;

obtaining long code group and frame sync information of a neighboring cell based on the calculated decision variables; and detecting a long code that is used for band spreading of a forward link by a current base station based on the detected long code group and frame sync information.

* * * * *